United States Patent [19]

Lamy

[11] 4,063,430
[45] Dec. 20, 1977

[54] LAYING OF SUBMARINE PIPES

[75] Inventor: Jacques Edouard Lamy, Fontenay aux Roses, France

[73] Assignee: C. G. DORIS (Compagnie Generale pour les Developpements Operationnels des Richesses Sous-marines, Paris, France

[21] Appl. No.: 670,146

[22] Filed: Mar. 25, 1976

[30] Foreign Application Priority Data

| Mar. 27, 1975 | France | 75.09631 |
| Jan. 16, 1976 | France | 76.01101 |
| Jan. 16, 1976 | France | 76.01100 |

[51] Int. Cl.² .............................................. F16L 1/00
[52] U.S. Cl. ...................................... 61/113; 61/105; 61/108
[58] Field of Search ............. 61/72.3, 72.1, 72.4, 61/72.5, 105–114

[56] References Cited

U.S. PATENT DOCUMENTS

| 3,136,529 | 6/1964  | Dickinson et al. | 61/72.3 X |
| 3,216,203 | 11/1965 | Giraud et al.    | 61/72.3   |
| 3,240,512 | 3/1966  | Pennington et al.| 61/72.3 X |
| 3,466,881 | 9/1969  | Lamy             | 61/72.3   |
| 3,568,456 | 3/1971  | Van Loenen       | 61/72.3   |
| 3,594,835 | 7/1971  | Wilson           | 61/72.3   |
| 3,620,028 | 11/1971 | Wilde            | 61/72.3   |
| 3,656,310 | 4/1972  | Brun et al.      | 61/72.3   |
| 3,940,942 | 3/1976  | Gower            | 61/72.3   |

Primary Examiner—Dennis L. Taylor
Attorney, Agent, or Firm—Laurence R. Brow

[57] ABSTRACT

The invention relates to a method of laying submarine pipelines by submergence from the surface or from an adjacent level with one point of the pipeline being secured near to the surface so that the pipeline on being submerged comprises a section descending from this point towards the bed and connected by a curved section to the part of the pipeline already laid on the bed, in which weights are suspended from the pipeline at intervals thereon, at least at the time of its submergence, such that the assembly has a slightly negative buoyancy and the pipeline sinks slowly in the water until it is slowed down and stopped when the weights contact the bed, the weights thus acting as a guide rope. The invention is applicable both to the case in which the sections of the pipeline are assembled on a floating device and the pipeline is lowered into the water as assembly proceeds while the floating device is moved along the laying course, and to the case in which the pipeline, previously constructed by the assembly of a certain number of sections, is towed along the laying course and is associated with floats which maintain the pipeline on the surface of the water or a short distance therebeneath and which can be put out of action to allow the pipeline to sink.

6 Claims, 9 Drawing Figures

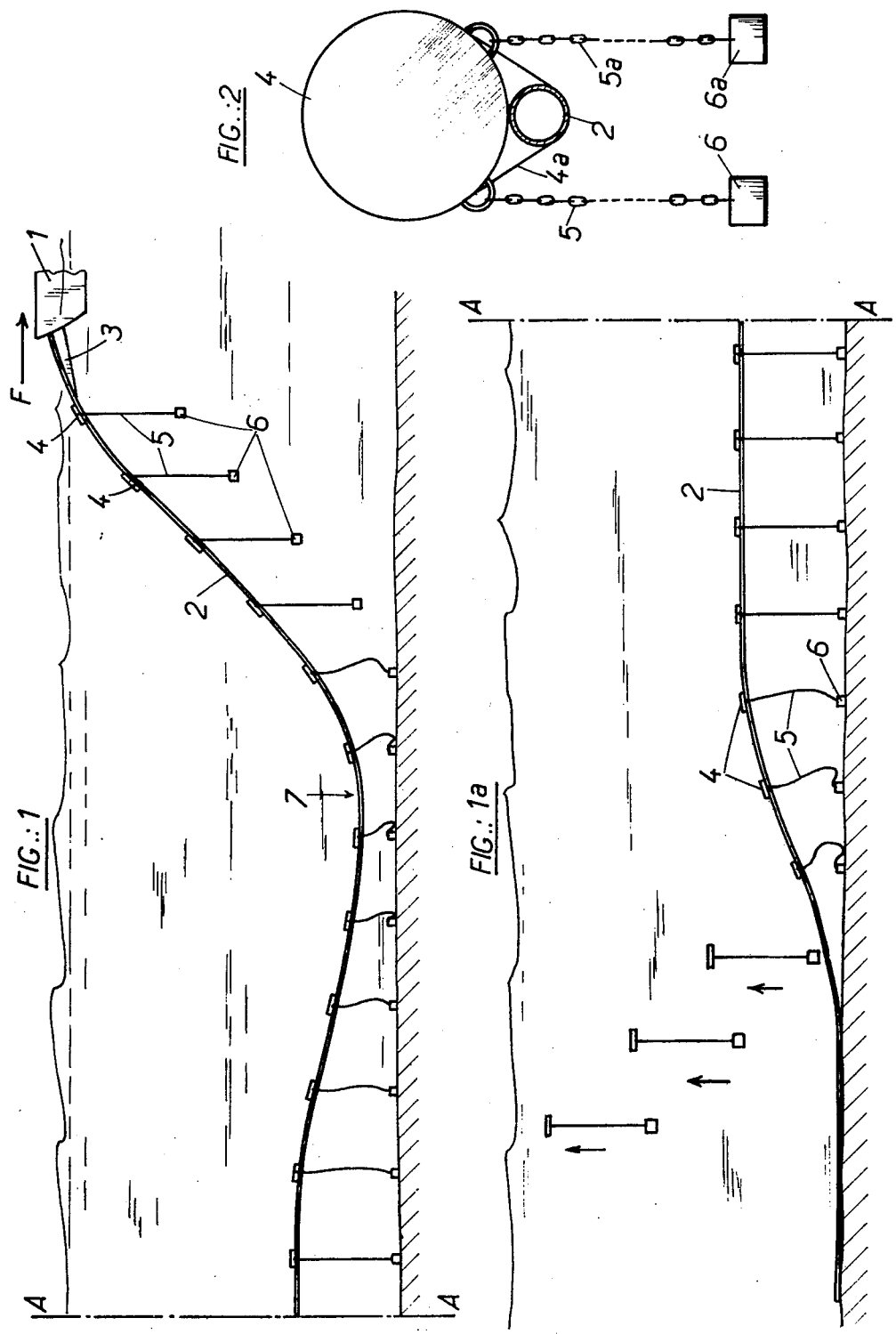

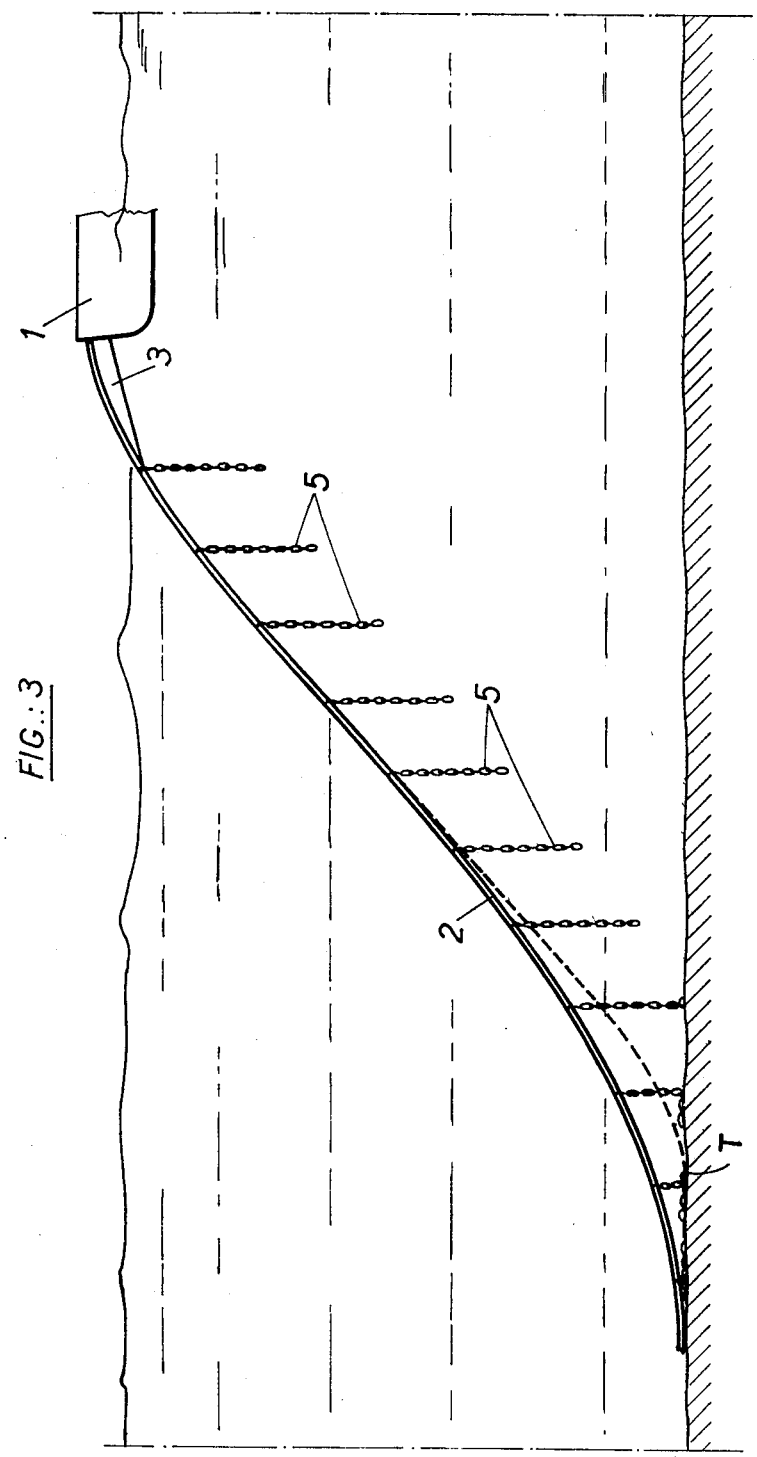
FIG.:3

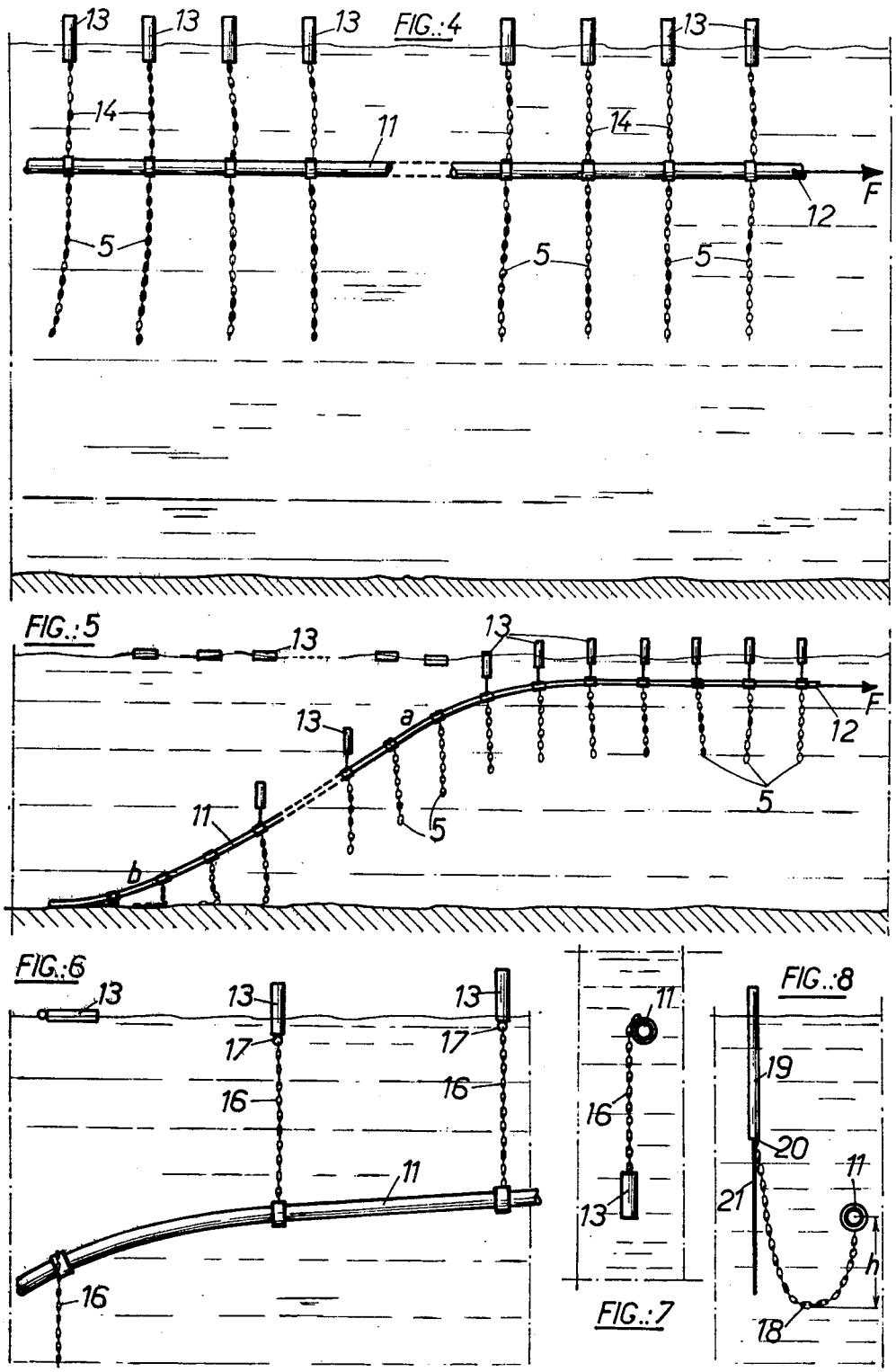

LAYING OF SUBMARINE PIPES

The present invention relates to the laying of pipes to lie on the bed of the sea or of a body of water.

Methods of submersion are already known in which the sections of pipe intended to form the pipeline are assembled on a specially equipped floating device such as a barge which is anchored and is moved intermittently, by action on the anchors, in accordance with the assembly of the sections and their submergence.

In other methods, the sections of pipe intended to form the pipeline or a part thereof are fabricated and assembled on a coastline and the pipeline, equipped with floats which keep it on the surface of the water, or preferably a short distance below said surface, is towed by a tug above the geographic laying line and then sunk by suppression of the action of the floats.

In these two types of method, one encounters difficulties due to excessive curvatures that the pipeline can assume in the transitional regions between the portion of the pipeline in the course of sinking and the portion already resting on the bed or that remaining attached to the barge or tug.

Although one can, to a certain extent, reduce the curvature, in the upper part of the pipeline, either by providing the barge with a suitably curved cradle on which the pipeline slides, or by not releasing all of the floats in the upper part of the pipeline, the risk of dangerous curvature remains on arrival on the bed, especially in the case of a deep well.

The invention provides a means of reducing the curvature in the lower part of the pipeline.

According to the invention, the pipeline is provided at intervals with weights suspended therefrom, for example cables or chains of suitable length, which serve the function of reducing the apparent weight of the pipeline from the moment they touch the bottom, in the manner of the guide rope of an aerostat, with however the new result that the curvature of the pipeline is reduced by comparison with the curvature it would assume in the absence of the guide rope.

It is convenient to adapt the construction of the pipeline to take account of the additional weight of the guide rope.

Furthermore, the length of the guide rope is adapted to the progressive slackening that is produced in its downward movement from the moment it touches the bottom.

The retention of the guide rope throughout the life of the submerged pipeline creates an anchorage on the bottom.

It has already been proposed to use guide ropes in laying a submarine pipeline but, in the previous method, it is a question of towing on the bed, by means of a tug, a pipeline fabricated on the bank and the guide rope has the sole function of preventing the rubbing of the pipeline on the bed by maintaining the pipeline a certain distance above the bed, the rubbing of the pipeline on the bed being replaced by the rubbing of the guide rope, which also enables drift due to transverse currents to be reduced. The previous method is therefore not concerned with the problem of reducing curvature between a part already laid on the bed and a part in the course of submergence situated between the surface and the bed.

The invention may be carried into effect in various ways.

A first embodiment relates to the case in which the sections of the pipeline are assembled on an anchored barge from where the pipeline is sunk as assembly proceeds while moving the barge along the laying course by action of its anchors.

The pipeline can be formed in the usual manner, that is to say that in order to ensure its submergence it is ballasted with a concrete coating of suitable thickness. This coating, which often includes a reinforcement, also protects the pipeline against shocks. On account of the porosity and fissuring of the concrete, one cannot rely on this coating to protect the steel pipe against corrosion and the pipe is therefore coated, before encasing in the concrete, with appropriate bituminous or plastic envelopes.

As a result, the pipeline has a certain weight in the water and this weight is increased by the weight of the guide rope. It is therefore advantageous to provide the pipeline with floats to take account of the weight of the guide line.

In a variation, the ballasting of the pipeline is reduced and a part at least of the weight necessary for submergence of the pipeline is provided by the guide line itself. The floats can then be dispensed with.

Another embodiment of the invention concerns the case in which the pipeline, fabricated on the bank, is towed by a tug above the laying course.

In this case, the pipeline is provided with floats and weights such as cables or chains, suspended from the pipeline, in such manner that the pipeline is maintained a short distance below the surface of the water, or even on the surface of the water, without contact of the suspended weights with the bed while the pipeline is being pulled by its end to lead it above the laying course. When one then releases the floats, or some of them, or fills them with water, to cause the pipeline to sink towards the bed, the suspended weights act as a guide rope from the moment they touch the bed whereby the movement of the pipeline is slowed down and its curvature reduced on arrival on the bed, as described above.

The following description with reference to the attached drawing, which is given as a non-limitative example, will enable the method of carrying the invention into effect to be understood, the details included in both the drawing and the text, forming part of the invention.

FIGS. 1 and 1a, intended to be joined together along the line A—A, relate to the first embodiment and are the two parts of a schematic elevation of a pipeline in the course of being laid according to the method of the invention.

FIG. 2 is a view on a larger scale in a plane perpendicular to the axis of the pipeline and shows a float and a guide rope, FIG. 3 is an elevational view of a second embodiment of the invention.

FIG. 4 is a schematic view in elevation of a pipeline being towed near the surface of the water, according to a third embodiment of the invention.

FIG. 5 shows, on a smaller scale, the laying of this pipeline.

FIG. 6 is an elevational view of an embodiment in which chains attached to the floats or to certain of them, constitute a guide rope; and FIGS. 7 and 8 show two other variants, in perpendicular section of the pipeline.

In FIG. 1, 1 is the stern of an anchored barge on which the sections of the pipeline 2 are successively assembled. This barge is advanced in the direction of the arrow F along the laying course after each addition of a section to the pipeline already laid. The barge is provided on its stern with a suitably curved guide 3 down which the assembled sections of the pipeline slide into the water. At intervals, floats 4 are attached to the pipeline before its submergence, for example by means of bands 4a.

Chains or cables 5 of suitable length are suspended from the floats. These chains, which can be provided in pairs such that the chains 5, 5a of each pair are symetrically attached to respective parts of the float (FIG. 2), and carry weights 6, 6a of concrete for example. The whole arrangement is such that it has a slight negative buoyancy ensuring that the pipeline sinks relatively slowly in relation to the movement of the barge.

The chains 5 and the weights 6 act as a guide rope. When the weights 6 touch the bed, the pipeline is relieved of their weight and its descent is slowed down to be arrested when a sufficient quantity of the chains 5 itself rests on the bed, as may be seen for section 7 of the pipeline. It can oscillate there but the pipeline finally floats between two weights.

The length of the chains 5 will naturally be adapted to the profile of the seabed so that, in spite of depth variations, the pipeline is free from too pronounced curvatures. The fixing of the chains of the guide rope on to the pipeline can be made as it descends down the guide 3 or even before.

After the laying operation, the floats and guide ropes can be left in place since they facilitate the raising of the pipeline to the surface for inspections and repairs. One can also provide for them to be raised by arranging for the chains or the floats themselves, to which the chains are attached, to be disengageable by remote control, by mechanical or explosive devices, or even manually by diver. It is sufficient for this purpose to provide the bands 4a with an opening or rupturing member controlled remotely or in place. The left-hand part of FIG. 1a shows the pipeline resting on the bed after the release of the floats and the guide rope which are rising to the surface.

One can also allow the pipeline to rest on the bed without raising the floats and the guide rope by providing the floats with teleoperated or manually operated gates enabling them to be filled with water or on the contrary to replace the water by compressed air if it is desired to raise the pipeline.

As a variation, the weights 6 can be dispensed with if the chains themselves are sufficiently heavy.

The number and distribution of the floats are naturally variable according to the buoyancy of the empty pipeline.

In the embodiment of FIG. 3, floats are not used but the pipeline is lightened.

The following numerical indications can be given by way of example: for a pipeline of 40 cm diameter (16 pouces). It is usual to ballast it to render it autosubmergible by enclosing it in a layer of concrete of 2.3 density to a thickness of 5 cm. Instead, in the application of the invention, one reduces the thickness of the coating to 2.5 cm and adds a guide rope assembly.

The weight of concrete dispensed with per meter is: $11 \times 0.40 \times 0.025 \times 2300$ being about 73 kg/meter.

For 20 meters of pipeline, the weight of concrete dispensed with is thus about 1400 kg which can be replaced by 14 m of chain at 100 kg/m or 30 m at 50 kg/m.

Naturally, these figures are only exemplary. One could dispense with a larger or smaller part of the coating in order consequently to vary the length of the chains.

Because of the cost of the latter, one can replace them by heavy cables or even by cables carrying weights. The weights can be disposed as a string along the cable and can even be distributed unevenly along the cable, in particular near its end, in order to modulate the effect obtained at the moment of folding on the bed. An advantage of chains however is that they are not greatly subject to tangling.

The aspect that the pipeline assumes in the absence of the guide rope is shown in broken lines in FIG. 3 and in full lines the aspect resulting from the presence of the guide rope. It can be seen that in the latter case the curvature is less pronounced in the region of the bed.

The action of the guide rope on this reduction of curvature can be explained approximately as follows:

If one assimilates to a catenary curve the curve which the middle line of the pipeline describes without the guide rope (the curve in broken lines on the drawing) as far as the point T at horizontal tangent, the radius of curvature at this point T is given by the formula:

$$R = Fx/P$$

where Fx is the horizontal traction on the pipeline and P the weight per meter.

If now, the guide rope is placed on the pipeline, one can write the formula:

$$P = P_o + L.C$$

where P and $P_o$ are respectively the real weight and the weight in the water (taking into account any floats) of the section of the pipeline between two successive chains (the chains being assumed to be regularly spaced), L the height of a chain and C the weight of this chain per meter.

From the time the chain touches the bed, the term L.C diminishes and tends towards zero. As a result, the radius of curvature R is increased which is what one is seeking to achieve.

The presence of the chains causes the curvature of the pipeline to deviate from a catenary curve and the preceding analysis is approximate only, but the phenomenon of the increase of the radius of curvature subsists.

The length of the chains and their weight per meter are determined according to the curvature one wishes to obtain.

The empty pipeline can remain floating at a distance from the bed slightly less than the length of the chains and only rest on the bed when it is full. Vertical movements of the pipeline of small amplitude, in the course of which the chains fold and unfold, are thus possible but this is not inconvenient. The chains thus effect a flexible anchorage of the pipeline on the bed.

In the embodiment of FIGS. 4 and 5, a tubular pipeline 11 of which the sections have been assembled on a bank are towed in the sea along the laying course by a tug harnessed to the end 12 of the pipeline by a cable (not shown) and exerting on it a traction force F. The pipeline is maintained a slight distance from the surface of the water by floats 13 attached to the pipeline at intervals by cables or chains 14.

Once located above the track that it is to occupy on the bed, the pipeline is sunk, for example by releasing the floats or filling them with water. The force F contributes to the stability of the pipeline during its descent.

If it is desired to keep the part near the end 12 close to the surface, for example for eventually connecting another towed section to the end 12, or simply for maintaining the traction on the pipeline during the submergence, excessive curvatures of the pipeline, generators of rupture, can be produced in the part a (FIG. 5) in the region where a section of the pipeline still floating is connected to a submerging section, and also at b in the region where the said submerging section is connected to the section already laid on the bed. The system of floats enables an excessive curvature at a to be avoided, but one cannot release all the floats but must keep some of them on the submerging section so that the apparent weight of the pipeline (real weight less the hydrostatic pressure) will be sufficiently small or even slightly negative. Thus FIG. 5 shows that in this example only two out of three of the floats on a submerging section of the pipeline are released depending upon the depth of the swell and the curvature desired at a. However, one cannot rely upon the floats to reduce the curvature at b, all the more in that it is difficult to creat floats resistant to crushing at great depth so that one is obliged to release all the floats at a certain depth.

In order to reduce the curvature at b, the pipeline is provided at regular intervals (the same as or different from the intervals of the floats) with a guide rope 5 of the kind described above.

In fitting up the floats 13, account is taken of the weight of the chains 5 so that the floats can support the assembly of pipeline and chains at a certain distance from the surface for towing the pipeline, as described above.

When the floats are released, the chains are first to touch the bed, as shown at zone b in FIG. 5, and the pipeline is progressively relieved of their weight.

A diminution of the curvature at b is thus achieved as explained above.

The guide ropes can consist of chains suspended from the floats, if they are long enough. This is shown in FIG. 6.

The chains 16 suspended from the floats are attached to the floats by members 17 which can be actuated in place or telecommanded, for example by explosive devices, so that if one of the members 17 is put out of action, the corresponding chain 16 comes to hang below the pipeline, as shown on the left of FIG. 6, so as to act as a guide rope on reaching the bed.

In the embodiment shown in FIG. 7, the chains are not detached from the floats but the floats are provided with devices enabling them to be filled with water, the float and chain then hanging beneath the pipeline and together forming a guide rope.

FIG. 8 shows another embodiment in which the pipeline itself has a positive buoyancy but is maintained at a certain distance from the surface by the weight of the chain 18 attached at one end to the pipeline and at the other end to the float 19. The chain is long enough to hang in the form of a loop between the pipeline and the float.

When the system is in its equilibrium position, the pipeline is submerged such that the weight of the chains corresponding to the height L balances the buoyancy of the pipeline. If the latter moves downwardly, the height L diminishes and the weight of the chain ballasting the pipeline also diminishes so that the pipeline tends to rise again and, conversely, if the pipeline moves upwardly.

This system thus has a certain stability while allowing a sufficient length of chain between the pipeline and the float to form a guide rope when the connection 20 between the chain and the float is broken or when the float is filled with water to sink it.

It is convenient to provide the float with an appendage 21 to keep it on one and the same side of the pipeline and thus avoid the chains wrapping around the pipeline which might otherwise occur.

It may be said that once the float is released or sunk, the conduit will float above the bed; it can move on to the bed when it is filled with a sufficiently heavy fluid.

In all these examples, the floats can be constructed in any suitable manner.

On the drawing, floats in the form of elongated cylinders are shown which reduces the action of swell thereon, but other forms are possible.

The floats can be fixed directly to the pipeline. In this case, the chains constituting the guide rope are naturally independent of the floats.

Furthermore, it is not essential for the application of the invention that the pipeline should be towed beneath the surface.

The invention is also applicable to the case in which the pipeline would float on the surface by means of a suitable arrangement of floats attached thereto.

It is to be understood that the embodiments described are given by way of example only and can be modified, particularly by the substitution of equivalent techniques, without departing from the scope of the present invention.

I claim:

1. In a method of laying a continuous submarine pipeline with a part of the pipeline being already in position along the seabed while another part of the pipeline is abeyant adjacent the sea-surface, said parts of the pipeline being joined respectively to an oblique intermediate pipeline section through connecting bends, the improvement which consists essentially of:
    A. fitting a plurality of guide ropes at intervals along said pipeline, said guide ropes having a lengthwise distributed weight of flexible nature and imparting a slightly negative level of overall buoyancy to the pipeline, and
    B. sinking the pipeline continuously with the fitted guide ropes to the seabed,
    C. whereby the weight imparted by the fractional length of the guide ropes which engages the seabed is cancelled, said pipeline being disposed over the seabed by means of the flexible guide ropes, and
    D. whereby said pipeline section intermediate the parts disposed on the seabed and adjacent the sea-surface respectively is automatically regulated at a proper pipeline height over the seabed.

2. The method of claim 1 wherein the guide ropes are chains or cables.

3. The method of claim 1 wherein the pipeline by itself has a buoyancy sufficient for sinking without the help of said guide ropes, and floats are positioned at intervals along said pipeline raising the buoyancy with said guide ropes on said pipeline to said slightly negative level of overall buoyancy.

4. The method of claim 3 wherein the pipeline floats are connected releasably to the pipeline.

5. The method of claim 3 wherein the buoyancy imparted to the pipeline floats is removed by ballasting the floats with water.

6. The method of claim 3 wherein all of the pipeline floats are cancelled.

* * * * *